(12) United States Patent
Voigtländer et al.

(10) Patent No.: US 7,656,075 B2
(45) Date of Patent: Feb. 2, 2010

(54) NANOMANIPULATOR USED FOR ANALYZING OR MACHINING OBJECTS

(75) Inventors: Bert Voigtländer, Jülich (DE); Franz-Peter Coenen, Jülich (DE)

(73) Assignee: Forschungzentrum Julich GmbH, Julich (DE)

( * ) Notice: Subject to any disclaimer, the term of this patent is extended or adjusted under 35 U.S.C. 154(b) by 224 days.

(21) Appl. No.: 11/664,988

(22) PCT Filed: Sep. 27, 2005

(86) PCT No.: PCT/DE2005/001702

§ 371 (c)(1),
(2), (4) Date: Apr. 9, 2007

(87) PCT Pub. No.: WO2006/039887

PCT Pub. Date: Apr. 20, 2006

(65) Prior Publication Data

US 2009/0009033 A1    Jan. 8, 2009

(30) Foreign Application Priority Data

Oct. 9, 2004    (DE) .................. 10 2004 049 371

(51) Int. Cl.
*H01L 41/08*    (2006.01)
(52) U.S. Cl. ...................... 310/333; 310/328
(58) Field of Classification Search .......... 310/328, 310/330–333
See application file for complete search history.

(56) References Cited

U.S. PATENT DOCUMENTS 4,785,177 A    11/1988    Besocke
4,877,057 A  * 10/1989    Christensen ........... 137/625.48
5,260,622 A  * 11/1993    West ...................... 310/328
5,325,010 A  *  6/1994    Besocke et al. ........ 310/317

(Continued)

FOREIGN PATENT DOCUMENTS

DE    197 15 226 A1    10/1998

(Continued)

OTHER PUBLICATIONS

Hug, Hans J. et al; "A low temperature ultrahigh vaccum scanning force microscope"; American Institute of Physics Review of Scientific Instruments; vol. 70 No. 9; Sep. 1999; pp. 3625-3640.

(Continued)

*Primary Examiner*—Mark Budd
(74) *Attorney, Agent, or Firm*—Andrew Wilford

(57) ABSTRACT

The invention relates to a nanomanipulator that is used for analyzing or machining objects. Said nanomanipulator is equipped with several moving elements which can be adjusted to perform movements and support the object that is to be moved or an object holder in order to move at least one object relative to an analyzing position or machining position. Each of said moving elements is provided with one support area for the object that is to be moved or the object holder. The moving elements support at least one load-bearing plane in an axial direction of the nanomanipulator. The inventive nanomanipulator is characterized by moving elements comprising shearing piezo elements so as to move the load-bearing plane.

29 Claims, 5 Drawing Sheets

U.S. PATENT DOCUMENTS

| | | | | |
|---|---|---|---|---|
| 5,345,137 | A * | 9/1994 | Funakubo et al. | 310/323.16 |
| 6,252,333 | B1 * | 6/2001 | Iino et al. | 310/323.17 |
| 6,359,370 | B1 * | 3/2002 | Chang | 310/328 |
| 6,603,239 | B1 | 8/2003 | Michely | 310/328 |
| 6,617,761 | B2 * | 9/2003 | Ando et al. | 310/328 |
| 6,838,808 | B2 * | 1/2005 | Tanaka | 310/328 |
| 7,307,370 | B2 * | 12/2007 | Pan et al. | 310/328 |
| 7,375,351 | B2 * | 5/2008 | Choi et al. | 250/492.1 |

FOREIGN PATENT DOCUMENTS

| | | |
|---|---|---|
| WO | WO 01/09965 A1 | 2/2001 |

OTHER PUBLICATIONS

Shiraki, Ichiro, et al; "Independently driven four-tip probes for conductivity measurements in ultrahigh vaccum"; Elsevier Science/Surface Science 493; 2001; pp. 633-643.

* cited by examiner

NANOMANIPULATOR USED FOR ANALYZING OR MACHINING OBJECTS

CROSS REFERENCE TO RELATED APPLICATIONS

This application is the US national phase of PCT application PCT/DE2005/001702, filed 27 Sep. 2005, published 20 Apr. 2006 as WO2006/039887, and claiming the priority of German patent application 102004049371.5 itself filed 9 Oct. 2004, whose entire disclosures are herewith incorporated by reference.

FIELD OF THE INVENTION

The invention relates to a nanomanipulator for analyzing or treating objects.

BACKGROUND OF THE INVENTION

Scanning tunneling microscopes (STM) and scanning-force microscopes (SFM, AFM) are used for characterizing surface morphology in research, teaching, and industry.

The scanning tunneling microscope and scanning-force microscope are based on the principle of scanning a surface using a fine tip or scanning needle that is attached to a cylindrically tubular piezoelectric moving element. For a scanning tunneling microscope, the current is measured between the tip and the sample over the surface of a sample to be analyzed.

For a scanning-force microscope, instead of the scanning needle a lever, also referred to as a cantilever, is attached. In this case the force between the sample and the cantilever is used as the measurement variable.

A micromanipulator is known from DE 3610540 C2 [U.S. Pat. No. 4,785,177] for the micromovement of objects in the X-, Y-, and Z-directions, the object being supported on at least three cylindrically tubular piezoelectric moving elements. The moving elements have a closed, electrically conductive inner coating as well as multiple mutually insulated partial coatings on the exterior. By application of an electrical voltage between individual partial coatings and the inner coating, depending on the polarity the cylindrically tubular piezoelectric moving elements are caused to bend or deform in the X-, Y-, and Z-directions.

These motions are very precise, and are referred to below as "fine motions." Continuous motions may be performed with a precision as great as one-thousandth of a nanometer. In contrast, movement in a range of only several micrometers can be achieved by deformation of the piezo elements.

An inertial drive is used for coarse motion of an object or object holder. When the moving elements are appropriately actuated, for example by a sawtooth pulse, the object or object holder to be examined undergoes a change in position as the result of the inertia of the object or object holder. This motion is referred to below as "coarse motion," and spans the region of several nanometers to several millimeters. The coarse motion does not occur continuously as for the fine motion, but instead occurs in steps in the nanometer range, the width of which is specified by the amplitude of the sawtooth pulse. By means of coarse motions resulting from the inertial drive, it is possible to achieve straight-line motions in the X- and Y-directions for displacement of the position of an object or object holder relative to a sample to be examined.

In the discussion below, "micromotion" refers to both fine and coarse motions.

It is known from DE 38 44 659 C2 [U.S. Pat. No. 5,325,010] that in an axial, vertical orientation of the nanomanipulator the moving elements support an obliquely or helically extending support surface. The helically extending support surface may be divided into multiple uniform sections, at least one cylindrically tubular moving element supporting each section.

When the cylindrically tubular moving elements are appropriately actuated, the helically extending support surface is set into rotation. This results in a coarse motion of the treating or analyzing plane in the axial direction (Z-direction) as well. The displacement exceeds that which would be achievable by application of an electrical voltage to the piezo element itself. By use of this method it is possible, for example, to roughly move a tip or scanning needle to the sample.

When the moving elements are appropriately actuated or moved in another manner, the support surface may undergo a horizontal coarse motion in the X- or Y-direction. If the object is brought into an appropriate position by the coarse motions in the X-, Y-, and Z-directions, an additional, more precise motion (fine motion) may be achieved by deformation of a cylindrically tubular piezo element by use of a scanning needle.

Micromanipulators are equipped with scanning needles for the above-mentioned purpose in order to analyze or treat an object or sample. The scanning needle is attached to a cylindrically tubular moving element. The piezoelectric effect causes the moving element to be deformed or bent, resulting in the desired relative motion between the scanning needle and the object (fine motion).

The aim of measuring the electronic characteristics and charge movement through nanostructures is achieved by changing from microelectronics to nanoelectronics.

From Shiraki et al (I. Shiraki, F. Tanabe, R. Hobara, T. Nagao, and S. Hasegawa, 2001, "Independently driven four-tip probes for conductivity measurements in ultrahigh vacuum," Surf. Sci. 493, 633-643) a four-probe system is known that is provided in a UHV SEM. Each probe represents a S™. The SEM is used to control the manipulation of the probes, and allows the probes to be localized. By rough positioning the probes are brought to within a few μm of one another. Cylindrically tubular moving elements having five electrodes each allow the probes to be positioned with precision, and move same in the nanometer range, thereby performing fine positioning of the probes. Electrical characteristics of components may be analyzed by use of, for example, four probes or scanning needles.

Also known from the prior art is a UHV nanoprobe. These allow a multipoint measurement to be carried out on semiconductors and biomolecular components, for example, down to the nanometer range. To this end, four scanning needles are brought to within approximately 600 nanometers of one another, and the conductivity of the component is independently measured between the scanning needles. The scanning needles may be independently positioned via appropriate coarse and fine manipulation.

A disadvantage of all the manipulators known heretofore is that a complicated mechanism is essential for the damping of vibrations.

Vibrations from the surroundings of the manipulator interfere with the ability to position the scanning needle and with the localization thereof using SEM, TEM, or comparable methods. For example, in the positioning of probes, vibrations resulting from ventilation units must be compensated for or damped.

It has been proposed to provide the tips, the object support, and all other devices that are necessary for positioning and localizing the tips or the sample, on an air-cushioned platform. Pneumatic automatic vibration dampers are also known from the prior art. The smaller the distance between the scanning needles and/or to the sample, the greater the effort required for suppressing such vibrations. For this reason the manipulators are costly.

OBJECT OF THE INVENTION

The object of the invention is to provide a nanomanipulator that is less susceptible to vibrations than those known from the prior art.

SUMMARY OF THE INVENTION

The nanomanipulator moves an object relative to an analyzing or treating position. The nanomanipulator has multiple moving elements that can be displaced to perform motions and support the object to be moved or an object holder therefor, each of the moving elements having a bearing face for the object to be moved or the object holder. The moving elements engage at least one lower support surface in an axial direction of the nanomanipulator. The lower support surface is part of the object or object holder to be moved.

The nanomanipulator is characterized by moving elements, each of which includes a shear-mode piezo element and moves the respective lower support surface. In addition to coarse motions, as a result of an inertial drive the moving elements are also able to perform fine motions. The design of the nanomanipulators according to the invention advantageously permits greater freedom of design compared to conventional nanomanipulators.

The nanomanipulator is advantageously used in analytical equipment such as electron microscopes, light-optical microscopes, laser systems, and the like. The nanomanipulator is preferably used in microscopes as an object support for the object to be examined.

For analysis in the nanometer range, it is very important for the nanomanipulator to have a rigid structure. Within the scope of the invention, it is recognized that a nanomanipulator must be designed so that its natural frequencies are higher than the vibrations from the surroundings. This is achieved by the use of small moving elements together with shear-mode piezo elements instead of thin, cylindrically tubular moving elements. Higher natural frequencies of the nanomanipulator mean lower sensitivity to external oscillations and vibrations having a lower frequency. In effect, this results in less sensitivity of the nanomanipulator to external vibrations, and thus results in better resolution in the imaging, treating, and analysis using, for example, a scanning tunneling microscope (STM).

Compared to the cylindrically tubular moving elements known from the prior art, the sum of natural frequencies of the moving elements together with shear-mode piezo elements engaging the various support surfaces is greater than that achieved by cylindrically tubular moving elements, and is also greater than the vibrational frequencies that act on the nanomanipulator from the outside.

For a comparatively smaller size of a nanomanipulator, it is advantageous that as the result of shear-mode piezo elements the nanomanipulator is less susceptible to external vibrations than are cylindrically tubular moving elements.

It is particularly advantageous that, as the result of the small size of the moving elements that include shear-mode piezo elements, the nanomanipulator may be designed more compactly than cylindrically tubular moving elements used heretofore.

Cylindrically tubular moving elements typically have dimensions of approximately 3 mm in diameter and approximately 15 mm in height. In comparison, in the present example moving elements including shear-mode piezo elements have a surface area of only 3 mm X-3 mm and a height of approximately 4 mm, the shear-mode piezo elements accounting for only approximately 2 mm of the height.

The nanomanipulator may include various types of shear-mode piezo elements that perform different motions, depending on the longitudinal shear effect.

The shear-mode piezo elements may have a layer sequence composed of an insulating ceramic (base plate), a thin contact layer provided thereon (made of tantalum, for example), and a first piezoelectrically displaceable ceramic layer provided thereon. A contact layer is provided on the last-named layer by vapor deposition. A second piezoelectrically displaceable ceramic layer is provided on the contact layer. In turn, an additional contact layer and a second insulating ceramic layer as a cover plate are provided thereon.

The two piezoelectrically displaceable ceramic layers have lattice structures that are orthogonally offset by 90° with respect to one another. Both piezoelectrically displaceable ceramic layers have contact layers on their upper and lower interfaces, and can therefore be contacted from both sides. As a result of the 90° offset with respect to one another and by suitable polarity of the voltage on the contact layers, targeted deformations may be made in the X- and Y-directions with respect to each insulating stationary base by means of the longitudinal shear effect. Motions may also be performed in the Z-direction by adding a further piezo element, contacted on both sides, between the base plate and cover plate whose motion is oriented perpendicular to the X-Y plane of the nanomanipulator.

In one advantageous embodiment of the invention, the nanomanipulator has exactly three moving elements together with shear-mode piezo elements for each support surface. Three moving elements ensure adequately solid support of the support surface by means of a three-point bearing.

The moving elements of the nanomanipulator, each of which has one piezo element, may in particular have a semispherical bearing face for the support surface.

In one particularly advantageous embodiment of the invention, the moving elements may include a magnet, in particular made of a rare-earth material. The magnet may be used, for example, as a bearing for the semispherical bearing face that is made of steel. Provided that the material of the support surface, for example as a part in a object holder or a part of another object to be moved, is made of a magnetic material, this material may be more easily joined to the semispherical bearing face of the moving elements. In addition, this measure by itself makes the nanomanipulator less sensitive to external vibrations.

The magnets are provided, for example, between the semispherical bearing face and the second insulating layer of the shear-mode piezo element. The insulating layer, magnet, and semispherical support are solidly connected together.

The various shear-mode piezo elements for the support surface generally have means for independent actuation. The actuation causes each shear-mode piezo element to perform motions in the X-, Y-, and/or Z-direction.

The moving elements are mounted on supports for the nanomanipulator, optionally at different axial heights.

The support surface is part of an object holder, ring, or sample to be examined. For an object holder, at least one scanning needle may be attached thereto. It is possible but not absolutely necessary for the scanning needle to be attached to the object holder by means of a cylindrically tubular moving element. The object holder holds the tubular moving element together with the scanning needle.

In a further embodiment of the invention, it is possible to provide multiple support surfaces in the nanomanipulator and to support and move same by means of moving elements that include shear-mode piezo elements. To this end, multiple support surfaces are superposed in the axial direction and are supported and moved by moving elements that include shear-mode piezo elements. The moving elements are oriented at different axial heights. Each support thus advantageously has seats for the moving elements at different axial heights.

In one particularly advantageous embodiment of the invention, the moving elements together with shear-mode piezo elements may also be provided on a support surface for supporting and moving an additional support surface. Motions of the nanomanipulator may be functionally decoupled from one another in a particularly advantageous manner.

In one very particularly advantageous embodiment of the invention, an opening is provided in at least one of the supports and additional supports engage through the opening. Even better use is thus made of the available space in the nanomanipulator in a particularly advantageous manner, and the natural frequency of the nanomanipulator is further increased.

In addition, an object holder provided in the nanomanipulator and having a tubular moving element to which a scanning needle is fixedly attached may have a support with an opening through which additional supports extend.

The scanning needle may be fixedly attached to an object holder by means of the cylindrically tubular moving element. The scanning needle is moved relative to a sample to be examined, i.e. an analyzing or treating position, by means of this supporting moving element. The moving elements together with the shear-mode piezo elements support the support surface of a retainer for the cylindrically tubular moving element together with the scanning needle. Thus, even though it is attached to a cylindrically tubular moving element, as a result of the shear-mode piezo elements the scanning needle is still insensitive to vibrations since it is decoupled from the surroundings due to the high natural frequencies of the shear-mode piezo elements.

It is advantageous for the cylindrically tubular moving element in the nanomanipulator to be deformable. An object holder that is fixedly connected to the scanning needle via a cylindrically tubular moving element is moved (coarse motion) by means of the inertial drive by actuation of the shear-mode piezo elements supporting the object holder, and is positioned relative to the analyzing and treating position. The cylindrically tubular moving element is actuated and deformed to achieve fine positioning, i.e. fine motion.

In another embodiment of the invention it is also possible to stationarily attach the cylindrically tubular moving element together with a scanning needle on or in the base of a nanomanipulator, and to move a sample to be examined over the moving elements that include shear-mode piezo elements.

With regard to the principle of the relative motion of an object, for example a scanning needle that is attached to a cylindrically tubular moving element, relative to a sample to be examined, and the synchronous and simultaneous deformation of the moving elements supporting the object holder or the sample, the contents of DE 3610540 C2 are incorporated by reference into the present patent application.

In a further advantageous embodiment of the invention, the nanomanipulator has at least one obliquely extending support surface. An obliquely extending support surface in the nanomanipulator is used to perform a coarse motion of the support surface and the objects attached thereto in the Z-direction.

A helical shape in particular may be provided as an obliquely extending support surface. The helical shape is thus a special embodiment of an oblique support surface. The oblique or helical support surface has the same function as that known from DE 38 44 659 C2, the contents of which are incorporated by reference into the present patent application.

Over an obliquely or helically extending support surface, a coarse motion of the object holder is achieved by excitation of the shear-mode piezo elements supporting the support surface, since the rotation of the shear-mode piezo elements in the support surface causes motion in the Z-direction.

In a further embodiment of the invention, an object holder together with a cylindrically tubular moving element and scanning needle as an object moving relative to the sample contains the obliquely extending support surface.

A cylindrically tubular piezo element having at least one scanning needle may be attached to an object holder that is moved by the shear-mode piezo elements, and the cylindrically tubular piezo element is moved over the stationary sample by means of the shear-mode piezo elements. The sample is analyzed and/or treated by appropriate actuation of the cylindrically tubular piezo element and the resulting fine motion of the scanning needle over the sample.

The support surface may also be part of a ring or a sample. In the latter case, the moving elements bear directly on the sample and move same in the various spatial directions. Coarse motion of the support surface in the X- or Y-direction may also be achieved by inertial translation as the result of a suitable motion of the shear-mode piezo elements that support the support surface.

In a further advantageous embodiment of the invention the nanomanipulator has more than one support surface.

As a result of shear-mode piezo elements for various support surfaces oriented in different axial directions, the overall size of the nanomanipulator is significantly smaller than that known from the prior art using cylindrically tubular moving elements as support elements. This advantageously results in higher natural frequencies of the nanomanipulator.

Multiple object holders to each of which one or more cylindrically tubular moving elements are attached may be provided in different axial directions. Each cylindrically tubular moving element has at least one scanning needle for the sample, thus allowing multipoint measurements.

Multiple object holders may thus have a helically extending support surface in a particularly advantageous manner. Scanning needles that are independently movable are then guided over the sample in the X-, Y-, and Z-directions.

In each case the motion sequences of two support surfaces may be associated with one another in the nanomanipulator. For example, a secondary support surface that is offset in the axial direction may be associated with each obliquely or helically extending primary support surface for performing coarse motions only in the Z-direction in order to perform coarse motions exclusively in the X- and Y-directions.

The secondary support surface may be part of a ring, which as a result of its flat design is used for positioning an object holder in the X- and Y-directions. For this purpose, moving elements together with shear-mode piezo elements may be provided on the ring for supporting the obliquely or helically extending support surface. Movement of the secondary support surface then causes a guided motion of the obliquely extending support surface.

If the nanomanipulator has both an obliquely or helically extending support surface and a secondary support surface, it is particularly advantageous to allow a decoupling of the motion of the object in the X- and Y-directions through the secondary support surface from the motion in the Z-direction through the obliquely or helically extending support surface. To this end, various types of shear-mode piezo elements are used that support these surfaces.

The opening in a support surface may have a circular or elliptical shape, for example. At least one cylindrically tubular moving element together with a scanning needle is moved through the opening. The opening is dimensioned such that at least one cylindrically tubular moving element is able to move therein in the X- and Y-directions.

The opening may be dimensioned in such a way that an additional support surface may be moved therein in all spatial directions. In addition to the cylindrically tubular moving element, additional, in particular helical, support surfaces may be provided or moved in an opening. In this manner, multiple support surfaces may be advantageously axially oriented in a single plane of the nanomanipulator. For a compact design, optimal use is thus made of the available space in the nanomanipulator, and the natural frequency is increased.

The support surfaces may have V-shaped grooves in which the semispherical supports of the shear-mode piezo elements are moved. The semispherical supports of the moving elements then advantageously sit in respective V-shaped grooves. In a helically extending support surface, the semispherical bearing faces of the shear-mode piezo elements are reliably guided via a V-shaped groove. These measures taken alone also make the nanomanipulator less sensitive to external vibrations. In this case the helically extending support surface is part of an object holder to which a cylindrically tubular moving element together with a scanning needle is attached. As a result of the V-shaped groove, in a particularly advantageous manner movement of the scanning needle due to rotation of the object holder occurs solely in the Z-direction, i.e. without movement component in the X- or Y-direction. Motions in the X- and Y-directions are thus decoupled from motion in the Z-direction.

The moving elements may be provided on a support surface for supporting an additional support surface. support surfaces may thus be guided in a particularly advantageous manner due to the motion of a support surface located axially thereunder.

The moving elements provided on a ring together with an opening support a support surface that optionally extends helically. These moving elements may include shear-mode piezo elements that are actuatable only in one direction tangential to the V-shaped groove. The direction of motion of these moving elements is consequently tangential to the V-shaped groove in the object holder of the helically extending support surface, and upon appropriate actuation results in a guided rotation of the object holder. As a result of the helical support surfaces of the support surface the rotation of the object holder causes the object holder to move in the Z-direction.

In a particularly advantageous manner, the combination of the obliquely extending support surface having the V-shaped groove together with a secondary support surface associated therewith in a plane of the nanomanipulator located axially thereunder causes the coarse motion in the X- and Y-directions resulting from the shear-mode piezo elements of the ring to be decoupled from the coarse motion of the object in the Z-direction resulting from the shear-mode piezo elements of the object holder having an obliquely or helically extending support surface. The ring having a secondary support surface is moved in the X- and Y-directions by the shear-mode piezo elements that support the ring. The obliquely, in particular helically, extending support surface in the object holder that is oriented axially thereabove is supported by additional shear-mode piezo elements provided on the secondary support surface. The ring contains the centrally positioned opening through which a cylindrically tubular moving element together with a scanning needle may be passed or moved on the object holder.

In this embodiment having offset support surfaces, a configuration of multiple object holders and cylindrically tubular moving elements is also possible. In this case, at least one ring and at least one object holder for the nanomanipulator have openings.

In one particularly advantageous embodiment of the invention, the nanomanipulator supports for the moving elements are designed in such a way that they have multiple seats, offset in the axial direction, for the moving elements. Thus, one support may bear, for example, two or even more moving elements in the axially offset direction, so that, depending on the number of moving elements per support, the support surfaces in the nanomanipulator may be supported and moved at different heights in the axial direction.

Nanomanipulators according to the invention may be used in a particularly advantageous manner to measure charge movement through nanostructures. For this purpose it is necessary for the nanostructures to be contacted by not only one, but by multiple scanning needles in order to measure the charge movement through the nanostructures. Two scanning needles represent the minimum. With four scanning needles the charge movement may be measured by a four-point measurement method, independent of contact resistances. A nanomanipulator according to the invention thus has a number of scanning needles suitable for the measurement on one or more cylindrically tubular moving elements that are attached with one or more object holders. For a nanomanipulator having four scanning needles, the surface of the object may be analyzed using the four-point measurement method in a particularly advantageous manner, such as for measurements of the conductivity between the scanning needles. Although for this purpose the moving elements may all bear on a single object holder having a corresponding support surface, the distance between the scanning needles is fixed. Each object, i.e. each cylindrically tubular moving element, to be moved is thus advantageously moved independently in the X- and Y-directions, decoupled from the Z-direction. Only by use of shear-mode piezo elements is it possible to make full use of the available space while at the same time providing protection from vibrations.

It is advantageous for the cylindrically tubular moving elements together with scanning needles to be eccentrically attached to the object holder(s) having support surfaces. This measure taken alone advantageously creates a better distribution of available space in the nanomanipulator.

For greater deflection, it is possible to stack multiple ceramic layers, adjustable in a shear-mode piezoelectrical manner, in an axially superposed configuration instead of using a tubular moving element.

The sample to be examined may be provided in a test-sample holder in a base plate at the bottom of the nanomanipulator. However, the sample may also be provided above the scanning needle, fixed to the tubular moving element, in the nanomanipulator. It is also possible to stationarily fix the sample to be examined in the nanomanipulator above an object holder, movable by moving elements, together with a cylindrically tubular moving element together with a scanning needle attached thereto.

The nanomanipulator or the sample holder thereof may advantageously be provided with cooling means to allow measurements at low temperatures.

The nanomanipulator may advantageously be part of a scanning tunneling microscope (STM) or scanning-force microscope. Such systems may be provided in a cryostat to allow analyses at very low temperatures.

BRIEF DESCRIPTION OF THE DRAWING

The invention is described in greater detail with reference to Examples and the accompanying figures. Identical components are denoted by the same reference numerals in the figures. More particularly.

SPECIFIC DESCRIPTION

Figure 1:
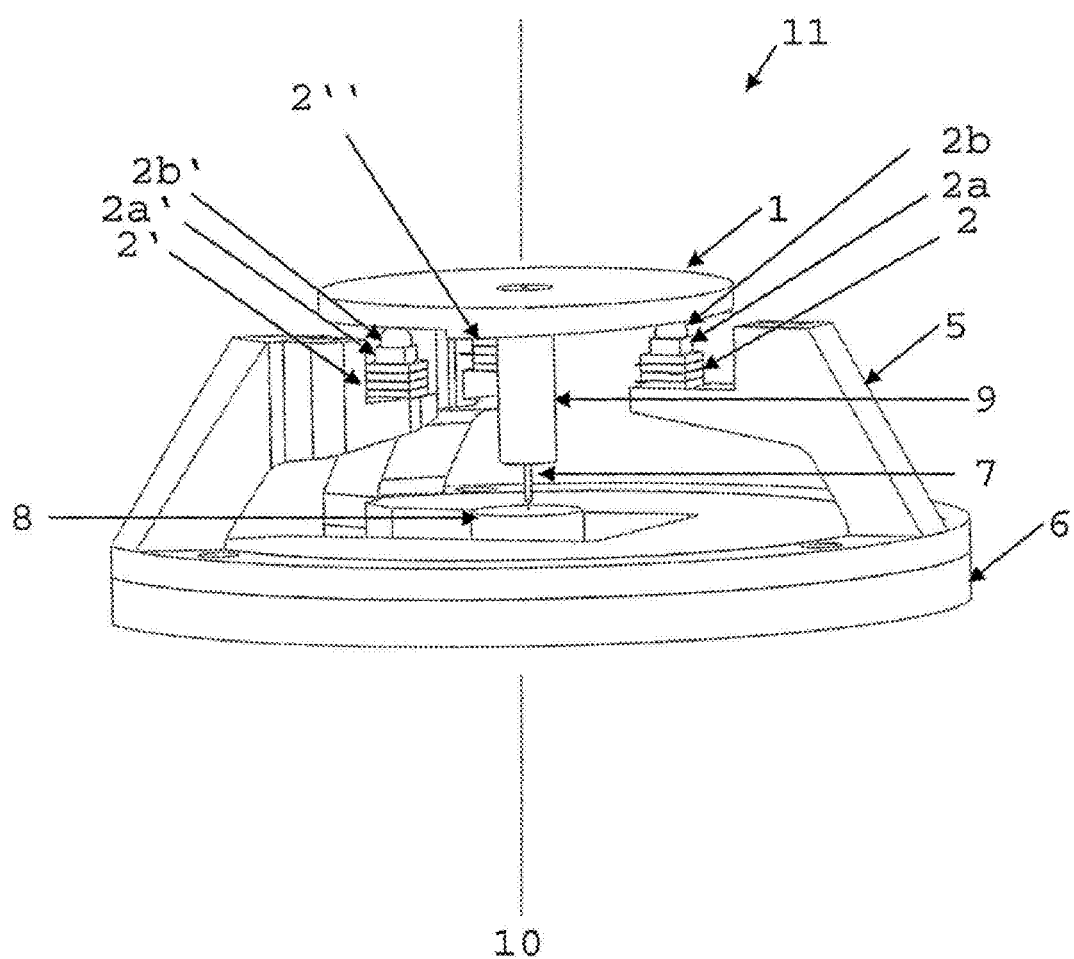
FIG. 1 is a perspective front view of a nanomanipulator according to the invention.

Each support surface of the nanomanipulator is supported by three moving elements and is optionally moved relative to a processing and analyzing position. Each individual moving element includes the shear-mode piezo elements for micromotion of an object. In addition to a shear-mode piezo element 2, 3, 32, 33, etc., each moving element has a respective magnet 2a, 2a', 3a, 32a, 33a, 33a', etc., in particular a magnet made of a rare earth material, that is fixedly connected to the layer stack of the shear-mode piezo elements. Semispherical supports 2b, 2b', 3b, 32b, 33b, etc. made of steel are attached to the magnets.

Because of the types of drawing views, some of the moving elements are not shown or are not completely observable, or are not provided with reference numerals.

Each moving element has contacts for excitation. The contacts are provided on the contact layers of the moving elements. The contacts are indicated by short lines extending from the layer edges, for example, at moving element 2' in FIG. 3. All three contacts are illustrated only on this shear-mode piezo element.

As a result of a 90° offset of the two piezoelectrically displaceable layers with respect to one another and by applying a suitable polarity of the voltage to the contact layer that is provided so as to be piezoelectrically displaceable between each outer layer, targeted deformations may be made in the X- and Y-directions of the piezoelectrically displaceable layers with respect to each insulating stationary base plate or cover plate by means of the longitudinal shear effect. Three contacts per moving element are provided on the contact layers of these moving elements, and for excitation of the piezoelectrically displaceable layers lead to the electrodes (not illustrated).

This requires regulation of the voltage curves in order to move a scanning needle on a tubular moving element by means of the object holder 1, 1a, 1a', and by means of the moving elements to move the scanning needle in any direction. Macromotions are achieved by stepwise addition of micromotions, also perpendicular to the treating or analyzing plane of a sample 8 provided at the bottom of the nanomanipulator.

Each of the shear-mode piezo elements 2, 2', 2" or 32, 32', 32" has two piezoelectrically displaceable ceramic layers offset by 90° with respect to one another for moving an object in the X- and Y-directions. The shear-mode piezo element comprises a stacked layer sequence composed of insulating ceramic as the base plate, a contact layer, a first piezoelectrically displaceable ceramic layer, an additional contact layer, a second piezoelectrically displaceable ceramic layer, an additional contact layer, and a second insulating ceramic layer as a cover plate for the second piezoelectrically displaceable layer. Since the contact layers are vapor-deposited and therefore very thin, for each shear-mode piezo element a layer sequence composed of four layers is illustrated in the figures. Each piezoelectrically displaceable layer is thus contacted by two contact layers on the upper and lower side.

The layer sequence of the shear-mode piezo elements 3, 3', 3" or 33, 33', 33" (FIGS. 2 through 5) cooperates only in the Z-direction and has the following composition. An insulating ceramic is used as a base plate, upon which a contact layer is provided, upon which a piezoelectrically displaceable ceramic layer is provided, upon which a contact layer is provided. An insulating ceramic layer is used as a cover plate or closure for the layer sequence. These shear-mode piezo elements are used in the nanomanipulators shown in order to perform motions in a helical support surface.

The object holders 1, 1a, and 1a' have on their undersides a helically extending lower support surface for the semispherical supports of the shear-mode piezo elements. The helically extending lower support surface is composed of three sections. The lower support surface is part of the object holders 1, 1a, and 1a'. A cylindrically tubular moving elements 9, 9' having a suspended scanning needle 7, 7' is fixedly connected to each of the object holders 1, 1a, and 1a'. Since each object holder 1, 1a, and 1a' is supported by three respective moving elements, relative motions by inertial translation are performed by deformation of the moving elements after excitation thereof, and by performing a coarse motion between the scanning needle 7, 7' and the sample 8.

In the Examples, the three sections of the helically extending lower support surface are not all visible because of the style of representation in the figures. In FIG. 1, for example, only the two front sections in the image plane are visible. Each of the three sections has the same shape in Example 1. In particular, each of the helical surfaces has the same pitch of 0.5 mm in each section. The pitch is selected such that sufficient adhesion is provided between the semispherical supports of the moving elements and the respective section of the helical, oblique lower support surface, even for relative motions between the object holder 1, 1a, 1a' and the piezoelectrically excitable shear-mode piezo elements. The moving elements must not slide on the object holder 1, 1a, and 1a' when in the rest position. In addition, deflection of the moving elements must be taken into account in selecting the pitch. Each section of a lower support surface is therefore supported by a respective moving element.

Figure 2:
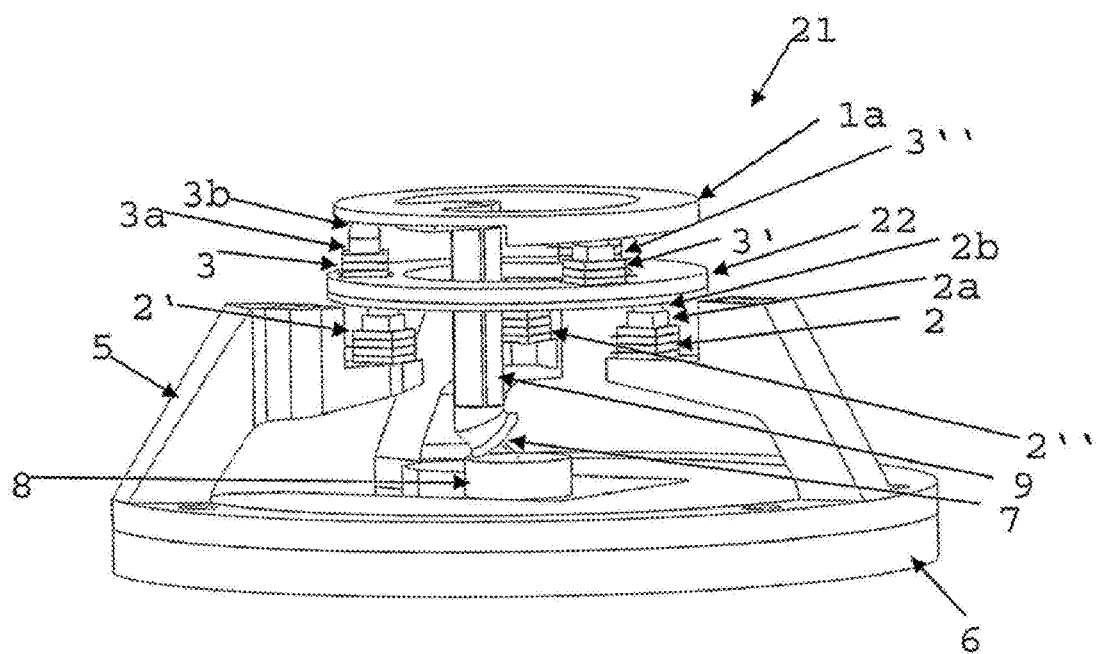
FIG. 2 is a perspective side view of another nanomanipulator in accordance with the invention.
Figure 3:
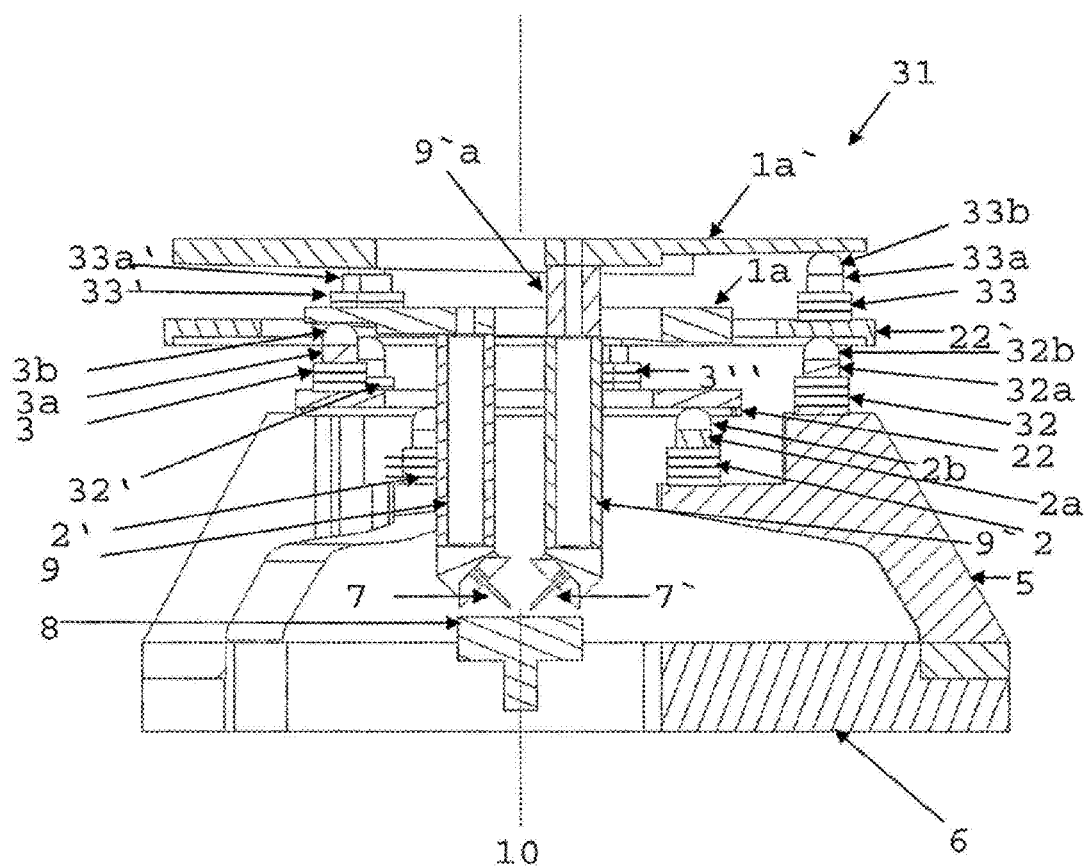
FIG. 3 is a vertical section through another manipulator according to the invention.
Figure 4:
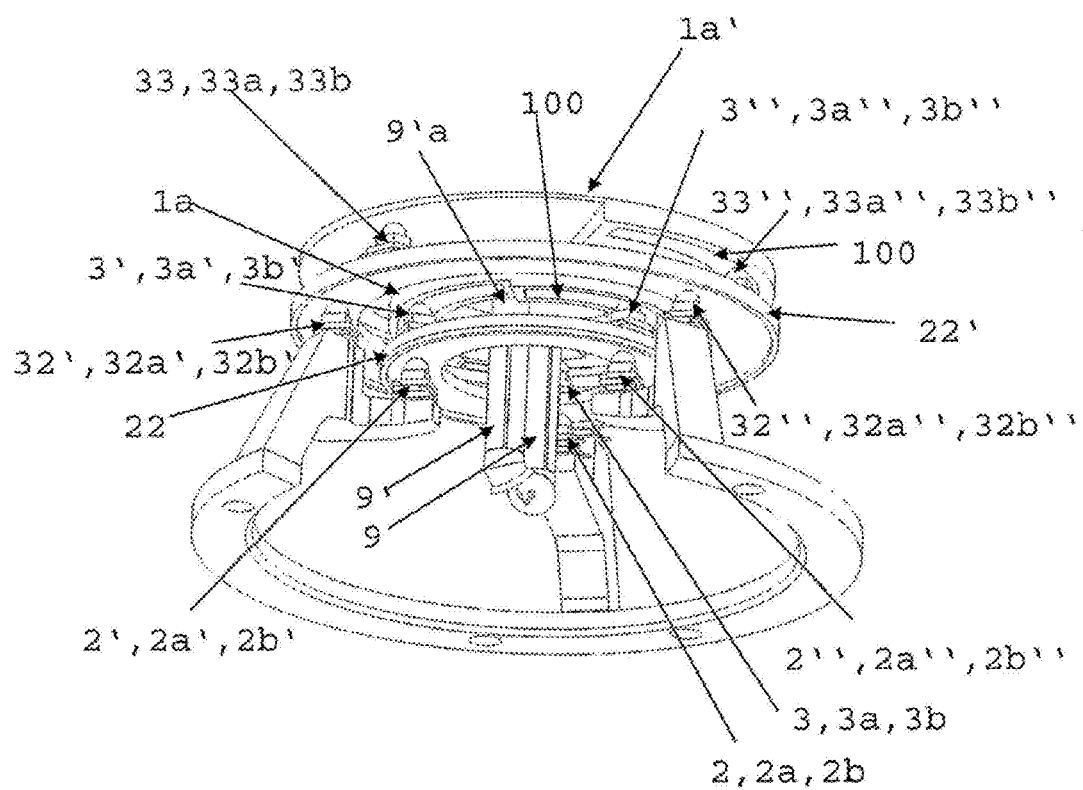
FIG. 4 is a perspective view from below of the manipulator of FIG. 3.

In the Examples of FIGS. 2, 3, and 5, the object holders 1a, 1a' or their support surfaces are adapted to the altered requirements. Furthermore, the object holders each have three lower support-surface sections having the same pitch of 0.5 mm for each section. Two of these sections have the same design, and are each provided with a radially extending V-shaped groove 100, as illustrated in FIG. 4 for accommodating the semispherical supports on the underside of the object holder. To compensate for possible differences in temperature expansions of the materials, the third section of the support surface is designed without a V-shaped groove. A configuration that is offset in height is necessary for compensating for the depth of engagement of the semispherical supports in the V-shaped groove. As a result of the altered design of the object holders 1a, 1a' and the direction of motion of the moving elements 3, 3', 3", 33, 33', 33" oriented tangentially with respect to the V-shaped groove, appropriate excitation of the moving elements allows guided rotation of the object holder without straight-line motion. A purely vertical motion of the scanning tip 7, 7' may be achieved by means of the cylindrically tubular moving elements 9, 9'.

Example 1

FIG. 1 shows a side view of a nanomanipulator 11 having three moving elements that support an object holder 1. Each moving element has shear-mode piezo elements 2, 2', and 2". A magnet 2a, 2a', 2a" is provided between each of the semispherical supports 2b, 2b', 2b" of the moving elements and the layer sequence of the shear-mode piezo elements 2, 2', 2". The magnet 2a, 2a', 2a" is used to couple the object holder 1, made of magnetic steel, to the supports 2b, 2b'. The third moving element is only indicated by the shear-mode piezo element 2" behind the image plane. The shear-mode piezo elements, magnets, and supports are glued to one another.

In FIG. 1, the scanning needle 7 on the cylindrically tubular moving element 9 is the object to be moved. The moving element 9 is attached to the object holder 1.

Each moving element is provided on a specially designed support 5 for a base plate 6. Only one of the three supports 5 is provided with reference numerals. The moving elements beneath the object holder 1 are used for coarse motion. For fine motion, the cylindrically tubular moving element 9 is centrally attached to the object holder 1.

On its free end the cylindrically tubular moving element 9 has the scanning needle 7. The scanning needle 7 is guided over the surface of a sample 8 by means of the moving elements, the object holder, and the cylindrically tubular moving element. The sample 8 is centrally and stationarily positioned in the base plate 6 of the nanomanipulator. The sample 8 is analyzed and/or treated by the scanning needle 7.

Example 1 involves a nanomanipulator 11 for an STM, the scanning needle 7 on the cylindrically tubular moving element 9 of the STM being displaceable with respect to the sample 8 in the X-, Y-, and Z-directions in the nanometer to millimeter range. The cylindrically tubular moving element is oriented in the central axis 10, illustrated by a dotted line, of the nanomanipulator 11. This configuration of the scanning needle 7 exactly between the shear-mode piezo elements 2, 2', 2" is not mandatory. The scanning needle 7 or the cylindrically tubular moving element 9 may also be attached at another location on the object holder 1, and in that case is eccentrically positioned on the object holder 1 or in the nanomanipulator 11.

The motion of the object holder 9 together with the scanning needle 7 in the X- and Y-directions is performed by inertial translation and by motion in the Z-direction resulting from inertial rotation.

Example 2

FIG. 2 shows a nanomanipulator 21 in side view, by means of which motions of the scanning needle 7 over the sample 8 in the X- and Y-directions are decoupled from motions in the Z-direction. The decoupling is achieved by the use of a pair of rings 1a, 22. The ring 22 having a secondary support surface is used for inertial translation in the X- and Y-directions. The object holder 1a, which is carried by the ring 22, is associated with the ring 22. The object holder 1a has a helically extending support surface for the inertial rotation, i.e. for vertical motion in the Z-direction.

The ring 22 has a large central opening through which the cylindrically tubular moving element 9 attached to the object holder 1a is guided and moved. The object holder 1a, the same as in the first Example, has a helically extending support surface. In this case, however, a V-shaped groove is additionally provided on the underside of the object holder 1a in two of the three support surfaces in which the semispherical supports 2b, etc. for the moving elements are supported. The third support surface is designed without a V-shaped groove to prevent jamming during differing temperature expansions. The V-shaped groove on the underside of the object holder 1a therefore bears on the semispherical supports 2b, etc. The V-shaped groove is not visible due to the representation in side view. As a result of the force of gravity and the magnetic material of the object holder as such, the semispherical supports for the moving elements together with the magnets and the V-shaped groove in the object holder 1a result in a stable bearing of the object holder 1a, which is insensitive to external vibrations. The V-shaped groove prevents lateral straight-line motion in the X- and Y-directions when the moving elements supported therein undergo deformation. This ensures strictly vertical motion of the scanning needle 7 in the Z-direction during the rotation.

The shear-mode piezo elements for moving the object holder 1a are provided on the ring 22. The object holder 1a is guided through the ring 22 as the result of straight-line motion of the ring. The excitation and deformation of the shear-mode piezo elements 2, 2', and 2" mounted on the supports 5 result in straight-line motion of the ring 22. Since the shear-mode piezo elements 3, 3', and 3" of the corresponding moving elements are provided on the ring 22, the object holder 1a together with the cylindrically tubular moving element 9 and the scanning needle 7 is guided or moved in the X- and Y-directions over the surface of the sample 8 by means of the moved ring 22. There is no change in the Z coordinate of the scanning needle 7.

The cylindrically tubular moving element 9 is eccentrically positioned in the nanomanipulator 21. Rotation of the object holder 1a occurs as a result of the excitation of the shear-mode piezo elements 3, 3', and 3" in the helically extending support surface having the V-shaped groove. The motion of the cylindrically tubular moving element 9 together with the scanning tip 7 is performed only in the Z-direction.

It is advantageous to obliquely attach the scanning needle 7 to the lower end of the cylindrically tubular moving element 9. The scanning needle 7 is thus oriented with respect to the surface of the sample 8 at an angle less than 90°. This advantageously ensures that multiple cylindrically tubular moving elements, which together scan the surface of the sample 8, may be provided in an overall small available space when shear-mode piezo elements are used. This is desirable in particular for conductivity measurements in nanostructures.

One advantage compared to the configuration shown in FIG. 1 is that the motions in the X- and Y-directions are decoupled from the motion in the Z-direction. When only one object holder 1 is used, as in FIG. 1, horizontal motions also result in a change in the height of the center of the object holder 1. In Example 1, changes in the height also result in a straight-line motion of the object holder 1, and thus of the scanning needle 7. This disadvantageous coupling of horizontal and vertical motion is eliminated by the ring pair, using a flat ring 22 and an object holder 1a having guides in the helically extending support surfaces (see FIG. 2). The flat ring 22 having secondary support surfaces thus moves exclusively in the horizontal direction. The object holder 1 moves exclusively in the axial, i.e. vertical, direction.

Example 3

FIG. 3 shows a cross section of a nanomanipulator 31 having two rings 22, 22', each of which guides an object holder 1a, 1a'. FIG. 4 shows the same nanomanipulator in an oblique view from below.

For the motion sequences in the X-, Y-, and Z-directions, the object holder 1a is associated with the ring 22, and the object holder 1a' is associated with the ring 22'. The reference numerals, which are consistent with FIG. 2, denote the same components having identical functions. In this Example the motions of the two object holders 1a, 1a' in the X- and Y-directions are decoupled from the motion in the Z-direction, as previously described for a ring pair in Example 2.

In addition to the nanomanipulator illustrated in FIG. 2, the nanomanipulator 31 has an additional ring pair comprising a ring 22' and an object holder 1a'. The object holder 1a' with the cylindrically tubular moving element 9' eccentrically attached thereto and with a scanning needle 7' thereon is moved in the Z-direction by means of three shear-mode piezo elements 33, 33', 33".

Of the supports 33b, 33b', and 33b" only support 33b, which is located in the front image plane on the helical segment without a V-shaped groove 100 in the object holder 1a', is visible in FIG. 3. Supports 33b' and 33b" are not visible in FIG. 3. These supports move in a V-shaped groove on the underside of the object holder 1a' (see FIG. 4).

The shear-mode piezo elements 33, 33', 33" as part of the moving elements are provided on the edge of the ring 22' associated with the object holder 1a', in the direction of motion, i.e. tangentially.

Movement of the shear-mode piezo elements 32, 32', and 32" supporting the ring 22' results in a straight-line motion of the object holder 1a'.

As described for the nanomanipulator 21 in FIG. 2, a cylindrically tubular moving element 9, 9' and a ring pair, each ring composed of a helically extending support surface in the object holders 1a, 1a' and a flat ring 22, 22' having a secondary support surface, are provided for the motion of the scanning needle 7, 7'. Each cylindrically tubular moving element 9, 9' is thus independently moved over the sample 8.

This is only possible by use of the design having shear-mode piezo elements according to the invention, since the structure is significantly smaller and more compact and permits the use of two support surfaces for each cylindrically tubular moving element, each having a scanning needle. Since the object holder 1a with the cylindrically tubular moving element 9 attached thereto is provided in the central opening of the ring 22', a particularly compact design is achieved. This is not possible when cylindrically tubular moving elements are used instead of the shear-mode piezo elements.

Each ring pair has a flat ring 22, 22' having a secondary support surface for inertial translation exclusively in the X- and Y-directions, and having an object holder 1a, 1a' guided thereby having a helically extending support surface and a V-shaped groove for the inertial rotation, i.e. for vertical motion in the Z-direction.

Multiple cylindrically tubular moving elements, that together are able to scan a surface of the sample 8, may thus be provided in an overall small available space by the use of shear-mode piezo elements. This is desirable in particular for conductivity measurements in very small nanostructures.

Both cylindrically tubular moving elements 9, 9' are eccentrically attached to the associated object holders. A scanning needle 7, 7' is obliquely attached to each moving element 9, 9' in such a way that the free ends of the scanning needles lie on the axis of symmetry 10 of the nanomanipulator (see FIG. 3). This ensures that the scanning needles may be guided with respect to one another at a very small spacing of less than 100 nanometers.

The ring pairs 1a, 22 and 1a', 22' are freely displaceable with respect to one another.

Figure 5A:
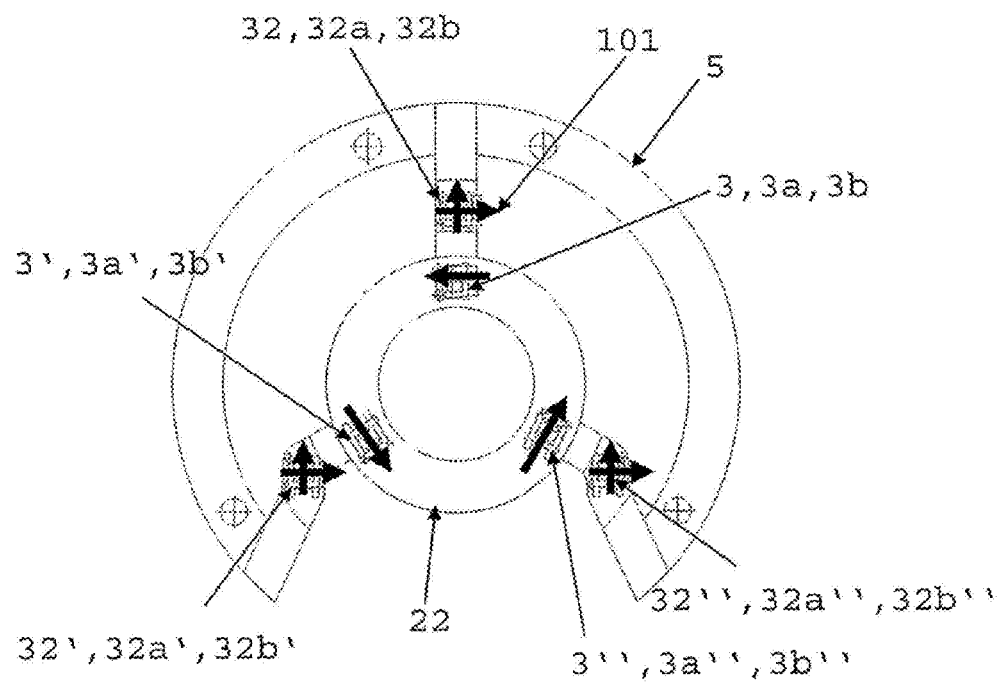
FIGS. 5a and 5b are plan and perspective views illustrating operation of the FIG. 3 manipulator.
Figure 5B:
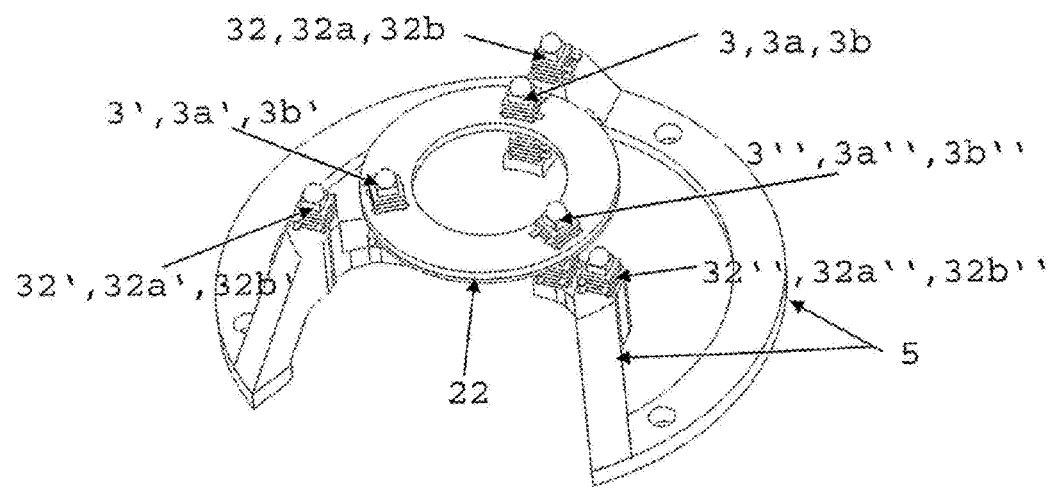

FIG. 5 illustrates in a top view the directions of motion of the shear-mode piezo elements of FIG. 3 by means of boldface arrows 101. Only one of the arrows is provided with the reference numeral 101. FIG. 5b shows a diagonal view from above of the configuration shown in FIG. 5a.

The shear-mode piezo elements 32, 32', 32" are provided on an upper location of the support 5, and support or move the ring 22'. The shear-mode piezo elements 3, 3', 3" are provided on the ring 22 and support or move the object holder 1a. The motion of the shear-mode piezo elements for the ring 22 and the object holder 1a' is performed in an analogous manner.

The straight-line motion is achieved by means of three moving elements, each having shear-mode piezo elements 2, 2', 2" and 32, 32', 32" that are movable in the X- and Y-directions. These moving elements are connected to the base plate 6 via the support 5. Each object holder 1a, 1a' provided thereabove performs a guided rotation relative to the lower ring 22, 22', respectively, since the associated moving elements together with the shear-mode piezo elements 3, 3', 3" and 33, 33', 33" are able to move only in the tangential direction. The shear-mode piezo elements are excited by a sawtooth pulse, which by means of the inertial drive initiates the motion of the ring and object holder.

FIG. 5b shows the configuration of the shear-mode piezo elements in an oblique view from above. Seats are provided at different heights in the supports 5 that allow a compact design for the nanomanipulator.

The independent motion of the individual object holders and rings has previously been shown, using a nanomanipulator as described in Example 3 and in FIGS. 3 through 5. Lateral motions in the range of 100 μm/s to several nm/s are possible when the shear-mode piezo elements are appropriately actuated. Vertical speeds having minimum values between 1 μm/s and several nm/s are achievable.

The cylindrically tubular moving elements 9, 9' are identical in the Examples. Only in the third Example is the moving element 9' attached via the connecting part 9'a to the object holder 1a' in order to lengthen the object holder.

Example 4

In an enhancement of the coupling of two pairs of object holders and rings shown in FIG. 3, four pairs of object holders having helically extending support surfaces and rings having secondary support surfaces are jointly provided in a nanomanipulator. In this manner it is possible to provide four cylindrically tubular moving elements on four object holders for a four-point measurement.

Example 5

The nanomanipulator of Example 4 may be simplified by moving four object holders having four helically extending support surfaces according to Example 1. The shear-mode piezo elements that support a helically extending support surface are attached to the three supports at different heights in the axial direction. All four helically extending support surfaces may thus be moved independently of one another. The use of rings having secondary support surfaces is omitted.

In this manner decoupling of the X- and Y-motions from the Z motion is omitted in favor of greater compactness. In order to move four object holders only four support surfaces are necessary, not eight as in Example 4. These object holders have openings as described for Examples 2 and 3.

For all Examples a modified embodiment is possible in which the respective rings and object holders are provided in the lower region near the base plate of the nanomanipulator. The cylindrically tubular moving elements that are then attached to the object holders are not suspended, but instead rise upward. A sample to be examined is stationarily mounted above the cylindrically tubular moving elements together with the scanning needle.

In a further embodiment, the cylindrically tubular moving elements 9, 9' are replaced by shear-mode piezo elements having the capability for excitation in the X-, Y-, and Z-directions. This modification as well may be applied to all the Examples.

In the Examples, the represented cylindrically tubular moving element may also be replaced by a moving element having multiple superposed shear-mode piezo elements. The nanomanipulator then comprises moving elements, each having multiple shear-mode piezo elements.

In the Examples, the scanning needle is attached to the object holder having the helically extending support surface, and the sample 8 is provided below the moving tip 7. An opposite configuration is also possible for all the Examples. In that case, the sample to be examined is moved over one or more stationary scanning needles in an object holder having an obliquely extending support surface. The sample 8 and the cylindrically tubular moving element 9, 9' together with the scanning needle 7, 7' would then be exchanged with one another in the figures.

The moving elements together with the shear-mode piezo elements 2, 2', 2" may also bear directly on an object to be examined, which is then moved by the shear-mode piezo elements over one or more stationary scanning needles. In this case an object holder may be omitted.

As a result of the cooperation of compact shear-mode piezo elements, the nanomanipulators shown in the Examples result in the formation of high natural frequencies for the nanomanipulators, the influence of the magnet by means of the magnetic semispherical supports on the object holder, and the configuration of each semispherical support in a V-shaped groove in the support surface in the object holder that independently provide an analysis or treating of a sample that is largely insensitive to vibrations, by means of relative motion between the scanning needles and sample over the shear-mode piezo elements.

Within the scope of the invention, instead of multiple moving elements it is possible to provide only a single moving element, including a shear-mode piezo element, in the nanomanipulator, provided that the bearing and guiding of the object to be treated is ensured. For moving an object relative to an analyzing or treating position, a nanomanipulator according to the invention then has at least one moving element that can be displaced to perform motions and that supports the object to be moved or an object holder therefor, the moving element having a support surface for the object to be moved or the object holder, and supporting a support surface. The nanomanipulator is characterized by a moving element that includes at least one shear-mode piezo element for moving the support surface.

The invention claimed is:

1. A nanomanipulator for moving two objects relative to an analyzing or treating position, the nanomanipulator comprising:
   two supports each carrying one of the objects and lying in respective planes offset along an axis, each support having a lower support surface, one of the supports being formed with a vertically throughgoing opening and the other of the supports having a part extending axially through the opening and carrying the respective object; and
   two respective sets of moving elements each having at least one shear-mode piezo element, each set bearing on the lower support surface of a respective one of the supports, the opening being dimensioned such that the part of the other support can move relative to the one support surface in a straight line.

2. The nanomanipulator according to claim 1 wherein each shear-mode piezo element has two piezoelectrically excitable contact surfaces offset by 90° with respect to one another.

3. The nanomanipulator according to claim 1 wherein each shear-mode piezo element has a single piezoelectrically excitable contact surface.

4. The nanomanipulator according to claim 1, further comprising
   means for independently actuating the shear-mode piezo elements.

5. The nanomanipulator according to claim 1 wherein the moving elements allow motions to be performed in the X- and/or Y- and/or Z-direction.

6. The nanomanipulator according to claim 5 wherein the nanomanipulator has three moving elements for three respective support surfaces.

7. The nanomanipulator according to claim 6 wherein the moving elements each have a semispherical support for supporting the respective support surface.

8. The nanomanipulator according to claim 1 wherein the moving elements each include a magnet.

9. The nanomanipulator according to claim 1 wherein the moving elements are provided on support for the nanomanipulator at different axial heights.

10. The nanomanipulator according to claim 9 wherein the moving elements each engage an obliquely extending lower support surface.

11. The nanomanipulator according to claim 10 wherein a helical shape serves as the obliquely extending lower support surface.

12. The nanomanipulator according to claim 1 wherein the support surfaces are each part of an object holder, a ring, or a sample to be examined.

13. The nanomanipulator according to claim 1 wherein the support surfaces are each formed with a V-shaped groove.

14. The nanomanipulator according to claim 1 wherein motions in the X- and Y-directions are decoupled from motions in the Z-direction.

15. The nanomanipulator according to claim 1 wherein at least one cylindrically tubular moving element is provided on at least one of the support surfaces.

16. The nanomanipulator according to claim 15 wherein a scanning needle of the nanomanipulator is attached to the cylindrically tubular moving element.

17. The nanomanipulator according to claim 1 wherein the nanomanipulator has four scanning needles for analyzing and/or treating the surface of an object to be examined.

18. The nanomanipulator according to claim 17 wherein each scanning needle is attached to a respective cylindrically tubular moving element.

19. The nanomanipulator according to claim 16 the scanning needle is oriented with respect to the sample at an angle that is less than 90°.

20. The nanomanipulator according to claim 1 wherein at least one cylindrically tubular moving element together with a scanning needle is eccentrically attached to each support surface.

21. The nanomanipulator according to claim 16, further comprising
    means for cooling surroundings of the scanning needle.

22. The nanomanipulator according to claim 1, further comprising
    a sample holder.

23. The nanomanipulator according to claim 22 wherein the sample holder is provided in a base plate of the nanomanipulator.

24. The nanomanipulator according to claim 1 wherein the support surface is provided in a base plate of the nanomanipulator.

25. A microscope, in particular a scanning probe microscope or SEM, including a nanomanipulator according to claim 24.

26. The microscope according to claim 25, further including a cryostat.

27. The nanomanipulator defined in claim 1 wherein the opening is dimensioned such that the part extending through it can move parallel to the support planes relative to the one part.

28. A nanomanipulator for moving an object relative to an analyzing or treating position, the nanomanipulator comprising:
    two moving elements each having at least one shear-mode piezo element; and
    a support carrying the object and having a lower support surface forming sections of a helix, each moving element engaging a respective one of the lower support surfaces.

29. The nanomanipulator according to claim 28 wherein each lower support surface has the same shape.

* * * * *